United States Patent
Guthrie et al.

(10) Patent No.: US 6,587,854 B1
(45) Date of Patent: Jul. 1, 2003

(54) VIRTUALLY PARTITIONING USER DATA IN A DATABASE SYSTEM

(75) Inventors: Christine Pae Guthrie, Menlo Park, CA (US); Jesper Andersen, Fremont, CA (US); Chon Hei Lei, Alameda, CA (US); Douglas James McMahon, Redwood City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/872,896

(22) Filed: May 31, 2001

Related U.S. Application Data

(63) Continuation-in-part of application No. 09/167,092, filed on Oct. 5, 1998, now Pat. No. 6,487,552, and a continuation-in-part of application No. 09/589,602, filed on Jun. 7, 2000.

(51) Int. Cl.[7] .............................................. G06F 17/30
(52) U.S. Cl. ............................................ 707/9; 707/10
(58) Field of Search .................................. 709/202, 203; 707/5, 1, 9, 10, 100; 340/5.54; 235/382

(56) References Cited

U.S. PATENT DOCUMENTS

| | | | | |
|---|---|---|---|---|
| 5,265,221 A | * | 11/1993 | Miller | 235/382 |
| 5,276,901 A | * | 1/1994 | Howell et al. | 340/5.54 |
| 5,428,778 A | * | 6/1995 | Brookes | 707/5 |
| 5,751,949 A | * | 5/1998 | Thomson et al. | 713/201 |
| 5,787,428 A | * | 7/1998 | Hart | 707/9 |
| 5,940,818 A | * | 8/1999 | Malloy et al. | 707/100 |
| 6,134,549 A | * | 10/2000 | Regnier et al. | 707/10 |
| 6,275,824 B1 | * | 8/2001 | O'Flaherty et al. | 707/1 |
| 6,363,387 B1 | | 3/2002 | Ponnekanti et al. | 707/10 |

* cited by examiner

Primary Examiner—Diane D. Mizrahi
Assistant Examiner—Yicun Wu
(74) Attorney, Agent, or Firm—Marcel K. Bingham; Hickman Palermo Truong & Becker LLP

(57) ABSTRACT

A method and apparatus are provided for storing data of multiple enterprises in a set of database objects in a database system and allowing multiple enterprises to interact with the database system as if those database objects contained only their data. According to an aspect of the present invention, a database command issued against a database object by a user is modified by adding predicates that limit access to data associated with the enterprise in which the user has data access. The predicates may specify conditions based on a column in the database object that identifies the enterprise. When a user issues a database command to add data to the database object, the column is populated in a manner transparent to the user. The data in the database object that is associated with a particular enterprise is stored in a separate tablespace.

30 Claims, 7 Drawing Sheets

VIRTUALLY PARTITIONING USER DATA IN A DATABASE SYSTEM

RELATED APPLICATIONS

This application is a continuation-in-part of and claims priority of U.S. application Ser. No. 09/167,092, filed Oct. 5, 1998 now U.S. Pat. No. 6,487,552, entitled "Database Fine-Grained Access Control", herein referred to as Lei, and naming as inventors Chon Hei Lei and Douglas James McMahon, the entire disclosure of which is hereby incorporated by reference.

This application is a continuation-in-part of and claims priority of related pending U.S. application Ser. No. 09/589,602, filed Jun. 7, 2000, entitled "Partitioned Access Control To A Database", herein referred to as Wong, and naming as inventors Daniel ManHung Wong, Chon Hei Lei, the entire disclosure of which is hereby incorporated by reference.

FIELD OF THE INVENTION

The present invention relates to database systems, and in particular, using database systems in a hosting environment to store data for users.

BACKGROUND OF THE INVENTION

Use of commercial off-the-shelf applications ("packaged applications") has proliferated. Enterprises are buying packaged applications instead of developing in-house applications, avoiding the higher cost associated with developing their own in-house applications. The kinds of packaged applications that may be purchased include applications for financial processing, manufacturing work-flow, human resources, and customer relationship management.

In addition to buying packaged applications, the companies are employing service companies to maintain the packaged applications and the computer systems upon which the applications run. One technique used by service companies to maintain and operate packaged applications is referred to as application hosting. Application hosting refers to a host (e.g. a company) that maintains applications for multiple enterprises on one or more computer systems, using the same computer infrastructure to run all the packaged applications. The term hosting environment refers to all the various components being maintained for an enterprise, including application components and computer infrastructure components (e.g. operating system, hardware). A hosting environment may be accessed via, for example, the Internet, or an extended intranet. Application hosting can reduce the cost of managing applications because it allows companies to share the resources needed to run a packaged application, resources which include computer components, application experts, and computer administrative support personnel, all of which are needed to operate an application.

The term enterprise is used herein to refer to a particular entity for whom an application and its associated data is being hosted. The entity may be a human individual or an organization, including, without limitation, a business.

A typical hosting environment typically follows the "silo" model. Under the silo model, limited components in the environment are shared by enterprises while most components are maintained for each enterprises.

FIG. 1 is a block diagram used to depict silo model 101. Silo model 101 depicts hosting environment component layers 110, 120, 130, 140, 150, and 160. Machine layer 10 represents the various hardware components used in a hosting environment, such as computers and disk drives. Operating system layer 120 represents the operating system used in a hosting environment, database system layer 130 corresponds to the database systems used in a hosting environment, schema layer 140 represents a collection of database objects in the database systems, database object layer 150 refers to the database objects in schemas. Application layer 160 refers to hosted application software.

Machine layer 110 and operating system layer 120 are typically shared while the remaining layers are typically not shared by multiple enterprises. Thus, a separate instance of a database system and application software is created and maintained for a hosted enterprise. These separate instances are referred to as a silo. For example, silo 171 and 172 are instances of unshared database system and application software components for a particular enterprise.

Whether a hosting environment component can be shared affects the "scalability" of the hosting environment. The term "scalability", as used herein, refers to the rate at which more resources are needed to host additional enterprises. A hosting environment scales better when less additional resources are needed to support new enterprises.

Sharing operating system and machine layers 110 and 120 promotes better scalability. An additional enterprise does not require installation of another operating system. On the other hand, the unshared nature of database system layer 130 and application layer 160 impedes scalability. Adding an additional enterprise requires installation of another instance of the database system and application software. In general, adding another instance of a hosting environment component to support an additional enterprise requires greater additional resources than would be otherwise required by using an already existing component to support the additional enterprise. Adding an additional instance of another hosting environment component requires more labor to install and maintain than simply reconfiguring and maintaining an existing instance to support another enterprise.

Improved scalability may be achieved by sharing more hosting environment component layers. For example, a single database system may be used for multiple enterprises. The application instances that access the database system access data in separate schemas within the database system. Each schema contains database objects for a particular enterprise. For example, data for one hosted payroll application may be stored in a table PAYROLL in one schema, while data for another hosted payroll application may be stored in a table PAYROLL in another schema.

To further improve scalability, application software and database objects may be shared. However, this is more problematic. Typically, application software is not developed with the features needed to use one instance of the application software to handle multiple enterprises. For example, application software is not configured to restrict user access to data according to the enterprise of the user accessing the data. Typically, an enterprise desires to separate its data from the data of another enterprise, and to confine access to its data to the users belonging to the enterprise. However, an instance of the application software typically uses one schema or set of database objects to store data, and provides no mechanism to logically or physically separate the data of multiple enterprises within a single set of database objects, let alone restrict user access to the separate data of the enterprise of the user.

Legacy application software may be re-engineered to restrict access to data according to the enterprise of the user. However, such modifications can be very expensive. For example, every database command programmed for an application may have to be examined and possibly rewritten so that the database command requests access to only the data of a particular enterprise. The term database command refers to commands that request the retrieval, selection, insertion, and modification of records. Typically, database commands conform to a database language. For example, a query that conforms to SQL.

New application software may be developed to handle multiple enterprises. However, developing software with this capability requires greater development effort and costs more. For example, queries that are developed to limit access to data of a particular enterprise are more complicated to program.

Based on the foregoing, it is clearly desirable to provide a mechanism that allows data for multiple enterprises that is generated by a single instance of an application to be stored in the same set of database objects while minimizing the cost of developing or redeveloping such applications.

SUMMARY OF THE INVENTION

Techniques are provided for storing data of multiple enterprises in a shared set of database objects in a database system and allowing enterprise users to interact with the database system as if the set of database objects contained only their data. According to an aspect of the present invention, a database command issued against a database object by an enterprise user is modified by adding predicates that limit access to data associated with the enterprise. The predicates may specify conditions based on a column in the database object that identifies the enterprise of the user. When a user issues a database command to add data to the database object, the column is populated in a manner transparent to the user. In one variation, the data in the database object that is associated with different enterprises is stored in different tablespaces.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for securely storing data of multiple enterprises in the shared database objects in a single database system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system (DBMS), data is stored in one or more data containers as tables. The term table is used to refer to any set of data that is processed as a set of records, each record being organized into one or more fields. In relational database systems, the records are referred to as rows, and the fields are referred to as columns. In object oriented database systems, the data containers are organized according to object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms row and column shall be used herein to refer respectively to record and field.

Figure 1:
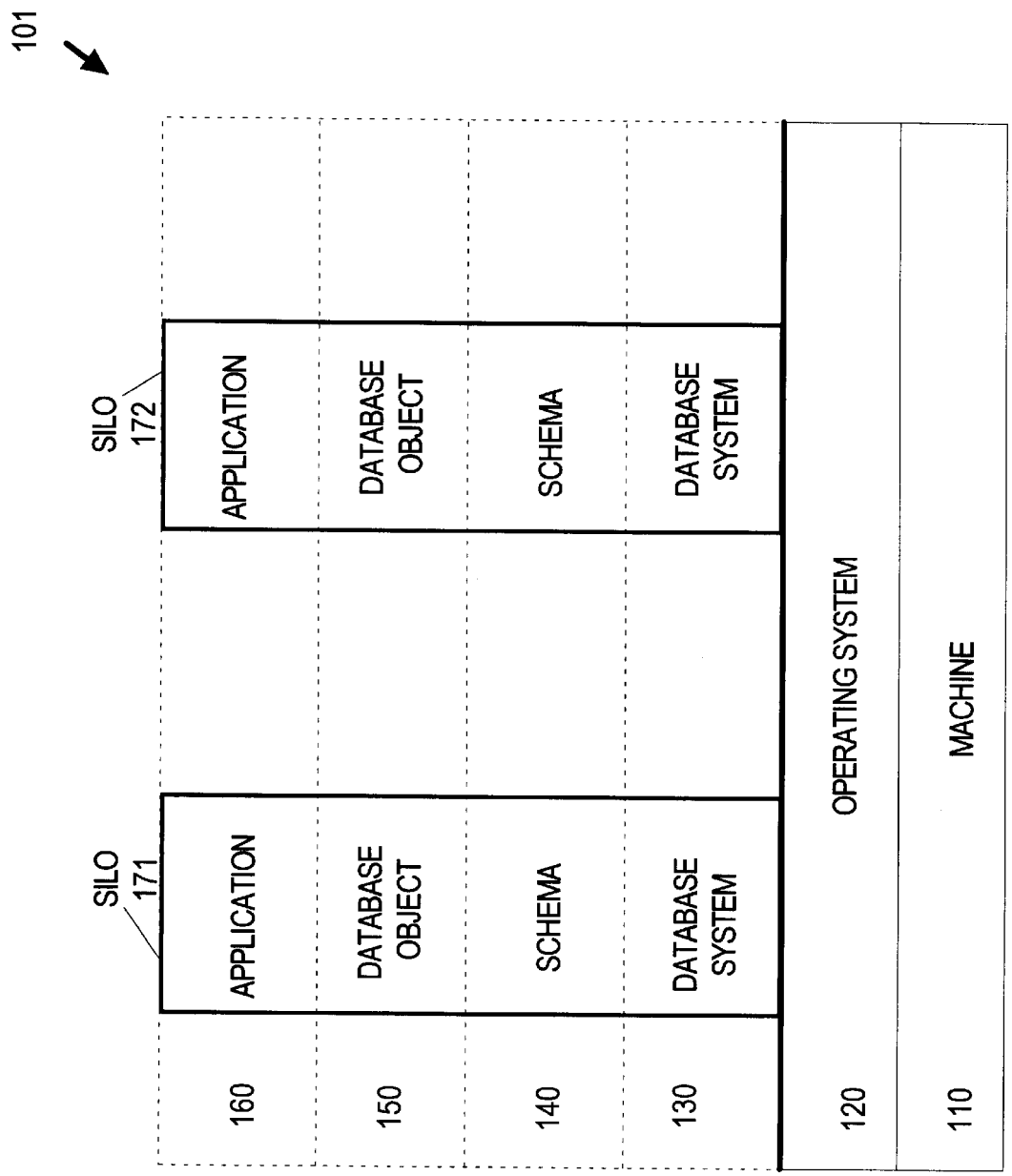
FIG. 1 is a block diagram depicting an application hosting environment that follows the "silo" model.
Figure 2:
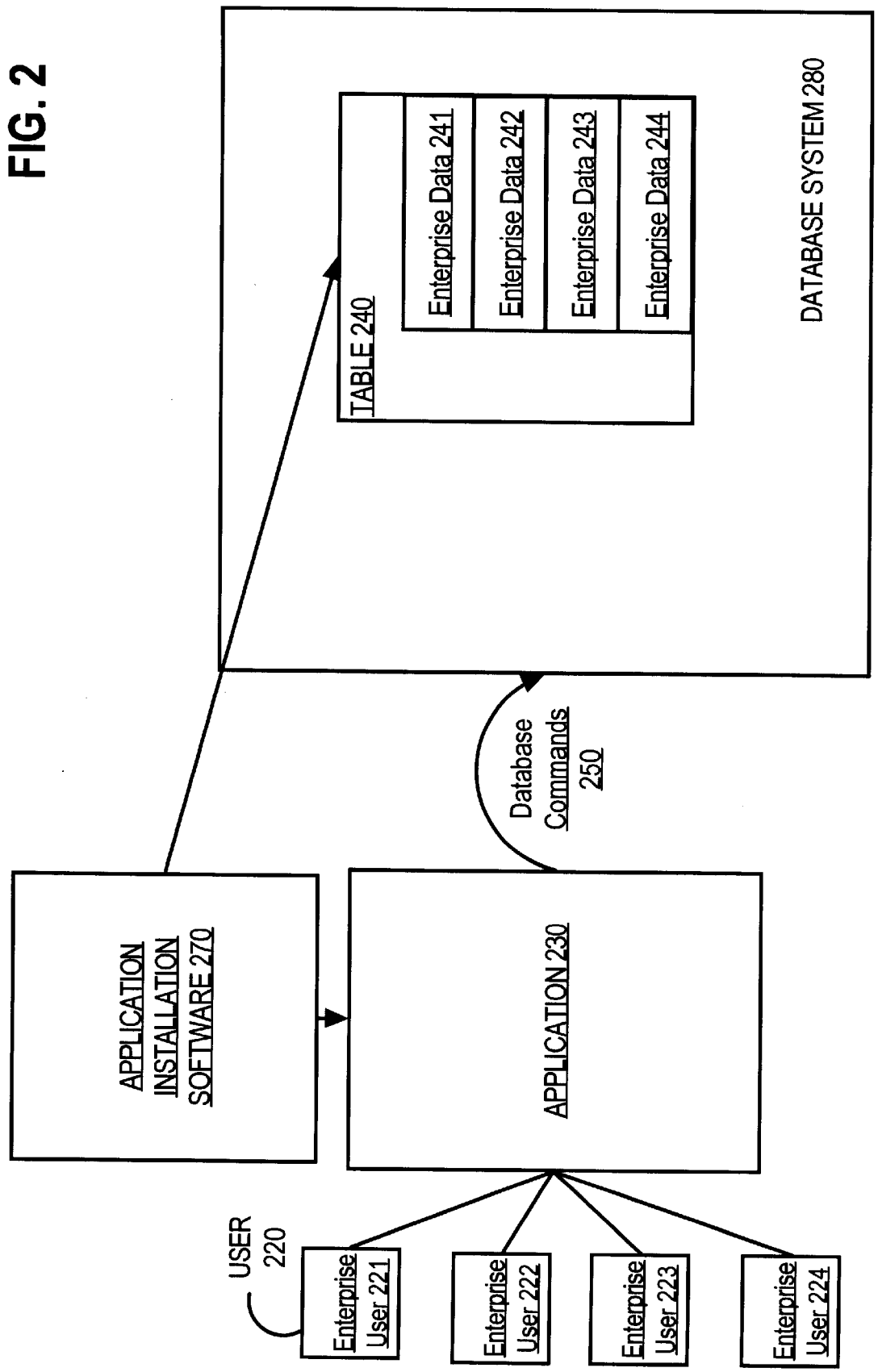
FIG. 2 is a block diagram depicting a database system used in an embodiment of the present invention.

FIG. 1 is a block diagram that depicts components that participate in a system for virtually partitioning enterprise data in a database system according to an embodiment of the present invention. Virtually partitioning enterprise data refers to the capability of a database system to store data for multiple enterprises in the same database objects while allowing an enterprise user to interact with the database system as if those database objects only contained the separate data of the enterprise. From the perspective of a particular enterprise user, the user is accessing data stored in the enterprise's own database system. In a hosting environment, the ability to store data of multiple enterprises in a single set of shared database objects improves scalability.

Database system 280 contains a variety of tables, such as table 240. Enterprise users 220 access their data in table 240 through application 230. Each of enterprise users 220 are associated with different enterprises. Application 230 refers to various software elements that may be accessed by multiple users of multiple enterprises. The software elements interact with the database system to carry out various application functions, functions that include generating screen displays, receiving user input, carrying out data processing operations that integrate and select data, and presenting the data to a user or to other processes which, in turn, present the data to the user. Application 230 may be comprised of software stored and accessible as database packages or in database libraries of database system 280. To carry out these functions, application 230 issues database commands 250 to database system 280 to retrieve and store data in database system 280.

Application 230 is installed using application installation software 270. The application installation software loads software elements for application 230 onto a computer system and configures the computer system to run the application. Application installation software also interacts with database system 280 to create database objects used by application 230. During execution of application installation software 270 for an application 230, data definition language ("DDL") commands are issued to database system 280 to define and create database objects used by the application 230, such as table 240.

Tables in database system 280 contain multiple sets of enterprise data, where access to each of the sets is limited to a user of a particular enterprise. Table 240, for example, contains sets of enterprise data in the form of enterprise data 241, 242, 243 and 244. Enterprise data 241 contains rows that may be accessed by only enterprise user 221. Likewise, enterprise data 242, 243, and 244 may only be accessed by enterprise users 222, 223, and 224, respectively.

The term "enterprise partitioned data" refers to the fact that data within a single table has been broken up into sets (such as enterprise data 241, 242, 243, and 244) to which access is limited to users of a particular enterprise. Although not required for the techniques described herein, enterprise partitioned data may be physically separated such that the data for separate enterprises is stored in separate data files, as shall be later described. A table that contains enterprise partitioned data is referred to herein as an enterprise partitioned table.

Figure 3:
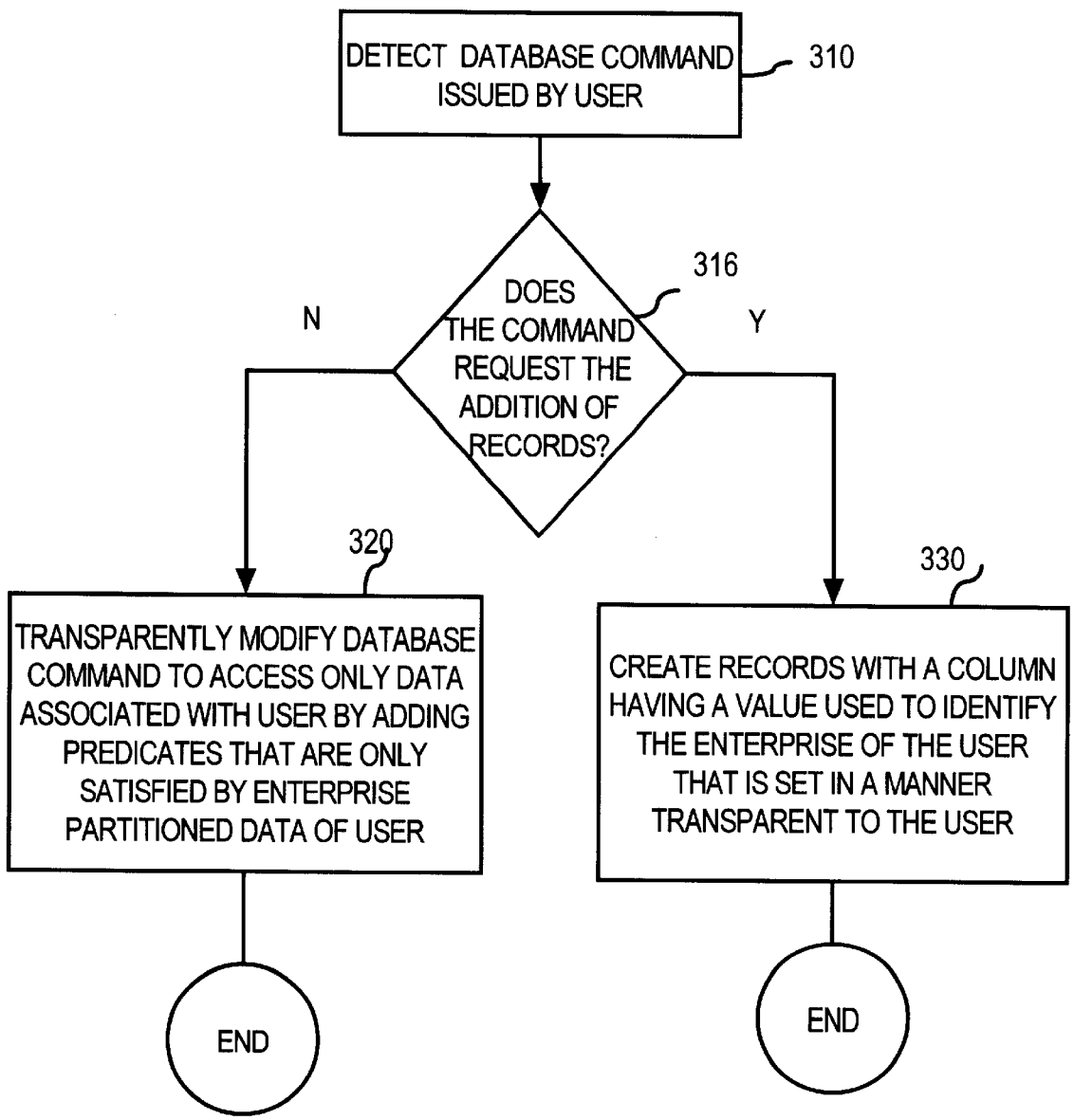
FIG. 3 is a flowchart showing an overview of techniques used to virtually partition enterprise data.

Virtual partitioning of enterprise data is provided, at least in part, by limiting a enterprise user's access to its enterprise's partitioned data. FIG. 3 is a flowchart showing an overview of a process that controls access to enterprise partitioned data. At step 310, database system 280 detects a database command issued by an enterprise user that requires access to a table holding enterprise partitioned data. As indicated at block 316, if the database command is a DML (data manipulation language) command requesting the insertion of records, then execution proceeds to step 330. A DML command is a command that requests insertion, modification, or deletion of records.

At step 330, database system 280 creates records with a column having a value used to identify the enterprise of the user. The value in the column of each row is set to the appropriate value in a manner transparent to the user. Specifically, the column is set to a value that identifies the enterprise of the user even though the data command does not specify a value for the column. An operation is said to be performed "transparent to the user" when, for example, the operation is performed either in response to a request from a user, and (1) the operation is not expressly specified by the request; or (2) the operation is performed in a manner not expressly specified in the request. Step 330 thus describes an example of performing an operation in a manner transparent to the user because the value identifying the enterprise of the user was added to the column even though insertion of the value was not expressly requested by the DML command.

At step 320, database system 280 transparently modifies the database command to access only data associated with the user by adding predicates that may only be satisfied by the enterprise partitioned data associated with the user.

Components Used for Controlling Access To User Partitioned Data

Figure 4:
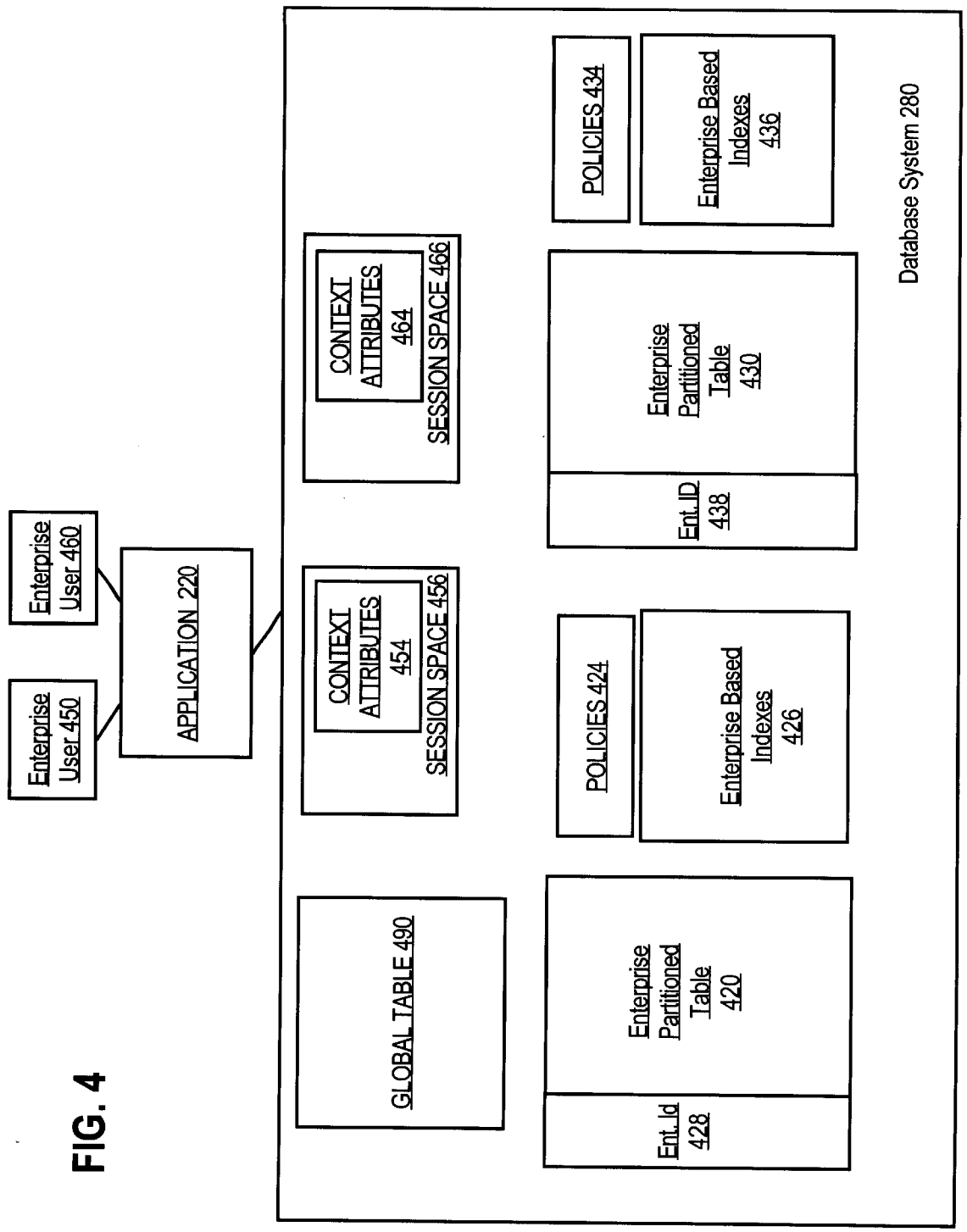
FIG. 4 is a flowchart showing an overview of components that participate in a system for virtually partitioning enterprise data.

FIG. 4 is a block diagram depicting in greater detail components in database system 280 used in a system for partitioned access control. Referring to FIG. 4, database system 280 includes enterprise partitioned table 420 and enterprise partitioned table 430. Each of tables 420 and 430 contains an enterprise identifier column which contains enterprise ids, values that uniquely identify an enterprise. Specifically, enterprise partitioned table 420 includes enterprise id column 428 and enterprise partitioned table 430 includes enterprise id column 438.

Enterprise partitioned tables 420 and 430 each contain sets of enterprise partitioned data, where each "set" is only accessible by users belonging to the enterprise. For example, enterprise users 450 and 460 are users of different enterprises. Within table 420, one set of enterprise partitioned data may only be accessed by enterprise user 450, and another set may only be accessed by enterprise user 460. The enterprise id in the enterprise id column of a row determines what set of enterprise partitioned data a row belongs to, and therefore, which enterprise user may access the data.

For purposes of illustration, in an enterprise id column, the enterprise id '428' identifies the enterprise data that enterprise user 450 may access, and the enterprise id '438' identifies the enterprise data that user 460 may access. Thus, the enterprise partitioned data for user 450 includes rows that contain the enterprise id '428' in an enterprise id column; enterprise partitioned data for user 460 includes rows that contain the enterprise id '438' in an enterprise id column.

According to one embodiment, the predicates that are added to produce modified queries are constructed to restrict enterprise users to enterprise partitioned data of the enterprise by making use of enterprise id columns. The predicates added may only be satisfied by rows having the enterprise id of a user in the enterprise id columns.

Indexing

Because the modified queries place restrictions on the enterprise id column of a table, enterprise id based indexes are provided to improve access to enterprise partitioned tables 420. An enterprise id based index is an index built on the enterprise id column of a table. Enterprise based indexes 426 are a collection of enterprise id based indexes for enterprise partitioned table 420. Each enterprise id based index is a composite index built on enterprise id column of table 420 and one or more other columns of table 420. Likewise, enterprise based indexes 436 are a collection of enterprise id based indexes for enterprise partitioned table 430. Typically, the enterprise id column is the leading column in an enterprise id based index.

Some tables may have a primary key column, which must contain a unique value for every row in a table. Primary key values are generated according to a primary key value generation scheme. The scheme used by each enterprise user generates unique key values for that enterprise relative to the other values generated for that enterprise. However, the scheme used by one enterprise user may generate a value that is not unique relative to the values generated by the scheme of a different enterprise. Consequently, a conflict arises when the same table is used to store the primary key values of both enterprises. For example, users of enterprise A and B use a purchase order number as a primary key. Enterprises A and B, as is typical, generate purchase order numbers sequentially, and therefore are very likely to eventually have an overlap between the purchase order numbers that they use. If enterprises A and B try to store their records in the same table, the primary key column will contain duplicate values.

To resolve such conflicts, primary keys for enterprise partitioned tables may be implemented as composite keys based on the enterprise id column and one or more other columns. Composite keys are keys based on a combination of two or more columns in a table. An enterprise id based composite key includes an enterprise id column and one or more other columns. Combining enterprise id values with primary key values that are unique for a particular enterprise results in a composite primary key value that is unique over all rows of all enterprises that are storing data in an enterprise partitioned table.

Fine-Grained Access Control

A system for limiting a user's access to the enterprise partitioned data may be implemented through a mechanism referred to as fine-grained access control. Fine-grained access control is a mechanism that relies on invoking policy functions associated with a database object when a database system detects that a database command issued against the database object. A policy is a combination of code and data that reflects rules that govern access to data, such as the data in database schema objects. A policy in the form of a function may return predicates that are added to queries to restrict access to a particular set of enterprise partitioned data. A fine-grained access control mechanism is described in Lei and Wong.

Enterprise partitioned tables 420 and 430 are each associated with policies; enterprise partitioned table 420 is associated with policies 424, and enterprise partitioned table 430 is associated with policies 434. Configurable database metadata on database system 280 defines the policy groups and their association with database objects. When database system 280 receives a database command that requires access to a database schema object, database system 280 inspects the database metadata to determine what policies to apply.

When executing a particular policy group to determine how access should be restricted, database system 280 needs information about the user. Such information may be found in context attributes 454 and 464. Context attributes contain information associated with a user and are maintained by database system 280. User context attributes are associated with a user session, are established when the user session is established, and may be changed by the user during the life of the user session. A user session is a specific connection of a user to a database server via a user process. Upon establishing a user session, database system 280 stores information, typically in memory, that pertains to the user session. The information maintained includes the user context attributes stored in association with a user session of the user.

For security purposes, it is desirable to prevent users from changing some context attribute values, such as one that identifies a user. The context attributes whose value a user is not allowed to set are referred to herein as primitive context attributes. Primitive context attributes may include, for example, the session id, the actual system time, and a value to use for a enterprise id. The responsibility of enforcing the restriction falls on an attribute setting mechanism controlled by database system 280.

Some context attributes of the user session may be set by the user with certain restrictions, other context attributes may be set by a user in an unrestricted manner. Database system 280 provides a mechanism for a database administrator to define functions that may be called to access particular context attributes. These functions may embed logic that implements rules that govern when and how the particular context attribute may be set or read.

Global table 490 contains global data. Global data is data in a table that is not enterprise partitioned. Examples of such data is a set of general system messages. Global enterprise partitioned table 490 includes no value for the enterprise id column and no policies are associated with the table. However, a table containing global data may include an enterprise id column that is simply not populated. Also, the table may be associated with policies that are used to restrict access in ways not based on an enterprise id column.

Transparently Limiting Access to Enterprise Partitioned Data

Figure 5:
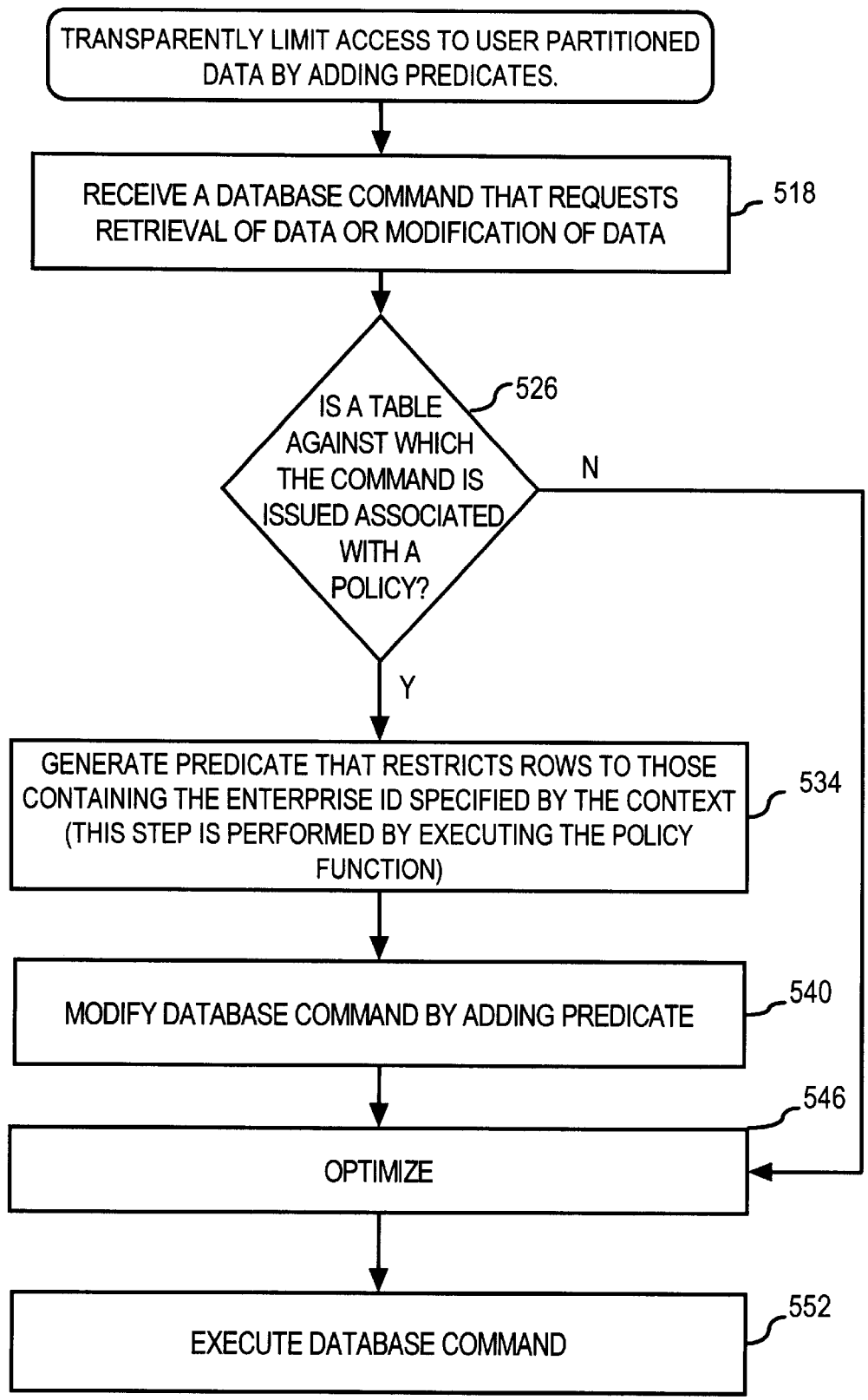
FIG. 5 is a flowchart showing a process for modifying queries to restrict access to a particular enterprise data.

FIG. 5 is a flowchart depicting a process for limiting access to enterprise partitioned data by adding predicates. The steps are illustrated by describing execution of a query that accesses enterprise partitioned table 420. For purposes of illustration, enterprise partitioned table 420 is an employee table named EMPLOYEE that includes, in addition to an enterprise id column, an employee_name and salary column. The query executed to illustrate the process is query QA, shown below.

select employee_name, salary from EMPLOYEE where salary>100000

The query was issued by application 220 for user 450 during a user session. Context attributes 454 include an attribute holding the enterprise id for user 450, which was generated when the user session was initiated. That attribute is referred to as the context enterprise id attribute.

At step 518, database system 280 receives a database command requesting either the retrieval of data or modification of data. In this example, database system 280 receives query QA.

At step 526, database system 280 determines whether a table against which the database command was issued is associated with a policy. The determination is performed by examining the database metadata that associates policies with any table referenced by the database command. If no table against which the database command was issued is associated with a policy, then execution of the steps proceeds to step 546. In this example, enterprise partitioned table 420 is associated with policies 424. Hence, execution proceeds to step 534.

At step 534, database system 280 generates a predicate that restricts rows to those containing the enterprise id specified by the context enterprise id attribute. This step is performed by executing a policy associated with enterprise partitioned table 420 that implements this step. Execution of the policy causes database system 280 to generate the following predicate PR:

"Enterprise_id=:SYS_CONTEXT(NAMESPACE, 'enterprise id')"

SYS_CONTEXT is a function supported by the database system 280 to a get value from a context attribute. The context attributes are stored in association with an application namespace. The parameters are used to specify the application namespace and the enterprise id attribute. The function is provided for purposes of illustration only, and not to limit the invention to any particular implementation.

At step 540, database system 280 modifies the database command by adding predicates generated at step 540. In this example, query QA is modified to query QA', which is shown below.

select employee_name, salary from EMPLOYEE where salary>100000 and enterprise_id=:SYS_CONTEXT (NAMESPACE, 'enterprise id')

After binding the function SYS_CONTEXT, predicate PR becomes the equivalent of "Enterprise_id=428".

At step 546, if the database command is a query, the query is optimized using query optimization procedures. Optimizing the query after adding the predicates at step 534 allows the optimization process to account for the added predicates. At step 552, the database command is executed.

The present invention has been illustrated using the fine-grained access control mechanism described in Lei and Wong to modify predicates. However, an embodiment of the present invention is not limited to such a system. Any mechanism may be used that securely and dynamically modifies predicates to limit access to a particular set of enterprise partitioned data.

Transparently Populating Enterprise ID Column Using Default User Value Generation To transparently set an enterprise id column to an enterprise id when inserting a row, the database system 280 uses default value population. Default value population refers to a process for generating a default value to which to set a column when adding a row, where the row is added while executing a database command that specifies no value for the column. Database metadata defines how the values are generated. The database metadata is created in response to receiving DDL commands that specify how to generate the values. These values are referred to herein as default values.

For example, when application installation software 270 is executed to install application 230, DDL commands are issued to database system 280. The DDL commands include commands that not only define the enterprise partitioned table 430, but that also specify how a default value for enterprise id column is generated. Specifically, the DDL commands specify that the default value for the enterprise id column is the value of the context enterprise id attribute.

Use of default value population is not required to implement the ability to transparently set the enterprise id column when inserting a row. For example, database triggers may be used to implement this ability. A database trigger is a procedure that is invoked upon the occurrence of a trigger event associated with the trigger. One example of a trigger event is the insertion of a row into a table. A trigger may be configured to populate the enterprise id column when a row is being inserted into enterprise partitioned table 420.

Partitioning Storage of Enterprise Data

Figure 6:
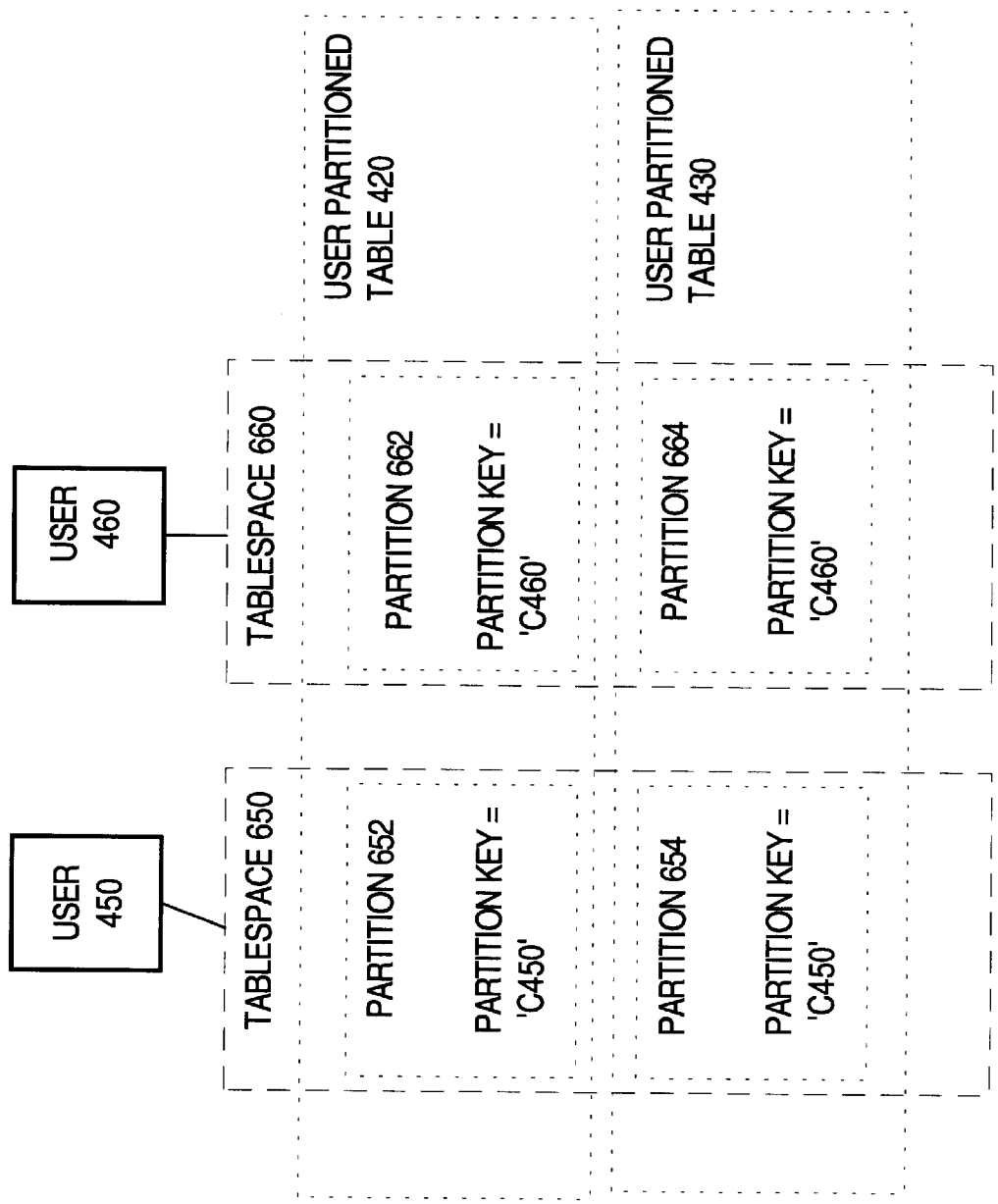
FIG. 6 is a block diagram showing use of tablespaces for partitioning enterprise data.

Enterprise partitioned data that is stored in multiple database objects may be consolidated and stored in a separate set of tablespaces that holds data only for the enterprise. A tablespace is a collection of storage containers (e.g. data files) used to store data for database objects, such as tables and indexes. A mechanism that may be used to store enterprise partitioned data in separate sets of tablespaces is referred to as "table partitioning". In table partitioning, a database object, such as a table, is divided into sub-tables, referred to as "table partitions". FIG. 6 is a block diagram that illustrates use of table partitions to store enterprise partitioned data in separate sets of tablespaces.

Referring to FIG. 6, enterprise partitioned table 420 is divided into table partitions 652 and 662, which are stored in separate tablespaces. Table partition 652 holds the enterprise partitioned data for enterprise user 450 in enterprise partitioned table 420. Table partition 652 is thus included in tablespace 650, which stores the data of enterprise user 450. Table partition 662 holds the enterprise partitioned data for enterprise user 460 in enterprise partitioned table 420. Table partition 662 is thus included in tablespace 660, which stores the data of user 460.

Likewise, enterprise partitioned table 430 is divided into table partitions 654 and 664. Table partitions 654 and 664 hold the enterprise partitioned data for users 450 and 460 in enterprise partitioned table 430, respectively. Accordingly, tablespace 650 contains table partition 654, and tablespace 660 contains table partition 664.

Database metadata in database system 280 defines what partitions exist for a table and in which tablespace the partitions reside. In addition, the database metadata defines partitioning criteria, which is used to determine which partition to store a particular record (e.g. row) in a table. Partitioning criteria may be based on (1) values in a particular field in a table, referred to as a partition key, and (2) rules that determine in which partition to store a record having a particular value for the partition key.

By establishing the enterprise id field of an enterprise partitioned table as the partition key, enterprise partitioned data may be separately stored in table partitions. Specifically, database system 280 may be configured to define enterprise id as the partition key for enterprise partitioned table 420, and to define partitioning criteria that specifies that records with a partition key value equal to '428' are stored in table partition 652, and that records with a partition key value equal to '438' are stored in table partition 662. Because database metadata can specify what partitions to store a record based on an enterprise id column in the record, records that have an enterprise id equal to '428' and that are associated with enterprise user 450 may be stored in tablespace 650. Likewise, records associated with enterprise user 450 are stored in a partition tablespace 660.

Indexes may be divided into "index partitions" that correspond to table partitions. Each index partition indexes the records in a table partition. Thus, an index partition for table partition 652 would only index the enterprise partitioned data of enterprise user 450. In this way, tablespaces can be implemented to not only exclusively hold the enterprise partitioned data, but indexes that index the enterprise partitioned data.

According to one embodiment, tablespaces 650 and 660 are pluggable tablespaces. The term "pluggable" is used to denote several characteristics about tablespace 650 and 660. First, these tablespaces may be separately taken offline, that is, made inaccessible to users, without affecting access to other tablespaces. This allows operations to be performed on tablespaces that require that the tablespace be inaccessible to its users without affecting other users. Examples of such operations include data recovery operations and back up operations. Second, tablespaces 650 and 660, or copies of them, may be integrated into other database systems. Pluggable tablespaces are described in (1) pending U.S. application Ser. No. 08/865,693. entitled "Tablespace-Relative Database Pointers", filed on May 30, 1997 by William H. Bridge, Jr., et al., the contents of which are herein incorporated by reference, and (2) pending U.S. application Ser. No. 09/675,195, entitled "Using Transportable Tablespaces For Hosting Data of Multiple Users", filed on Sep. 9, 2000, by Juan R. Loaiza, Hasan Rizvi, J. William Lee, the contents of which are herein incorporated by reference.

User Registration

The process of enabling an application and database system to support an additional enterprise is referred to as "user registration." During user registration, there are various steps performed to configure database system 280 so that it may support an additional user.

For example, an enterprise id value should be established for the enterprise. The database system may then be configured to set the context enterprise id attribute to this value when the user initiates a user session. Tablespaces are allocated for the enterprise, table partitions within them are defined for each enterprise partitioned table used by the application. Table partition indexes are also defined for each of the table partitions.

Advantages

Systems that use the techniques described herein to virtually partition enterprise data in a database system may be advantageously used in a hosting environment. Specifically, the same database objects may be used to store the data of multiple enterprises. This ability to share database objects is achieved without requiring that the legacy application software be re-engineered to partition user access to enterprise partitioned data. New applications may be developed without having to deal with the details of partitioning enterprise access to the shared database objects. Because single instances of database objects and applications may be shared by multiple enterprises in a hosting environment, the scalability of the hosting environment is improved.

Furthermore, the enterprise partitioned data may be segregated into table partitions in separate tablespaces. This satisfies the desire of many enterprises that their data be physically segregated from other enterprise data. In addition, operations that require that a tablespace be inaccessible to one enterprise may be performed on the corresponding tablespaces without affecting other enterprise data or their access to it. Examples of such operations include data recovery operations and back up operations. Finally, enterprise data may in fact be moved from one database system to another with little or no downtime for other enterprise users using the database system.

Hosting a Single Enterprise

While a system that virtually partitions enterprise data is useful when the same database objects are shared by multiple hosted enterprises, a similar system may be used when the database objects hold data for only a single enterprise. In this case, using indexes that have an enterprise column as the lead key causes overhead that yields little or no benefit. Because only one enterprise's data is stored in one schema or database system, indexes with lead enterprise id keys provide no selectivity, yet the leading enterprise id key must always be traversed when using the index to access data. To provide indexes with greater selectivity, indexes without an enterprise id key can be used.

To accommodate the need for indexes with or without an enterprise id column, application installation software may be configured to offer the option of creating both types of indexes. Based on user input specifying which option to use, the application installation software causes DDL commands to be issued to create the indexes accordingly.

Hardware Overview

Figure 7:
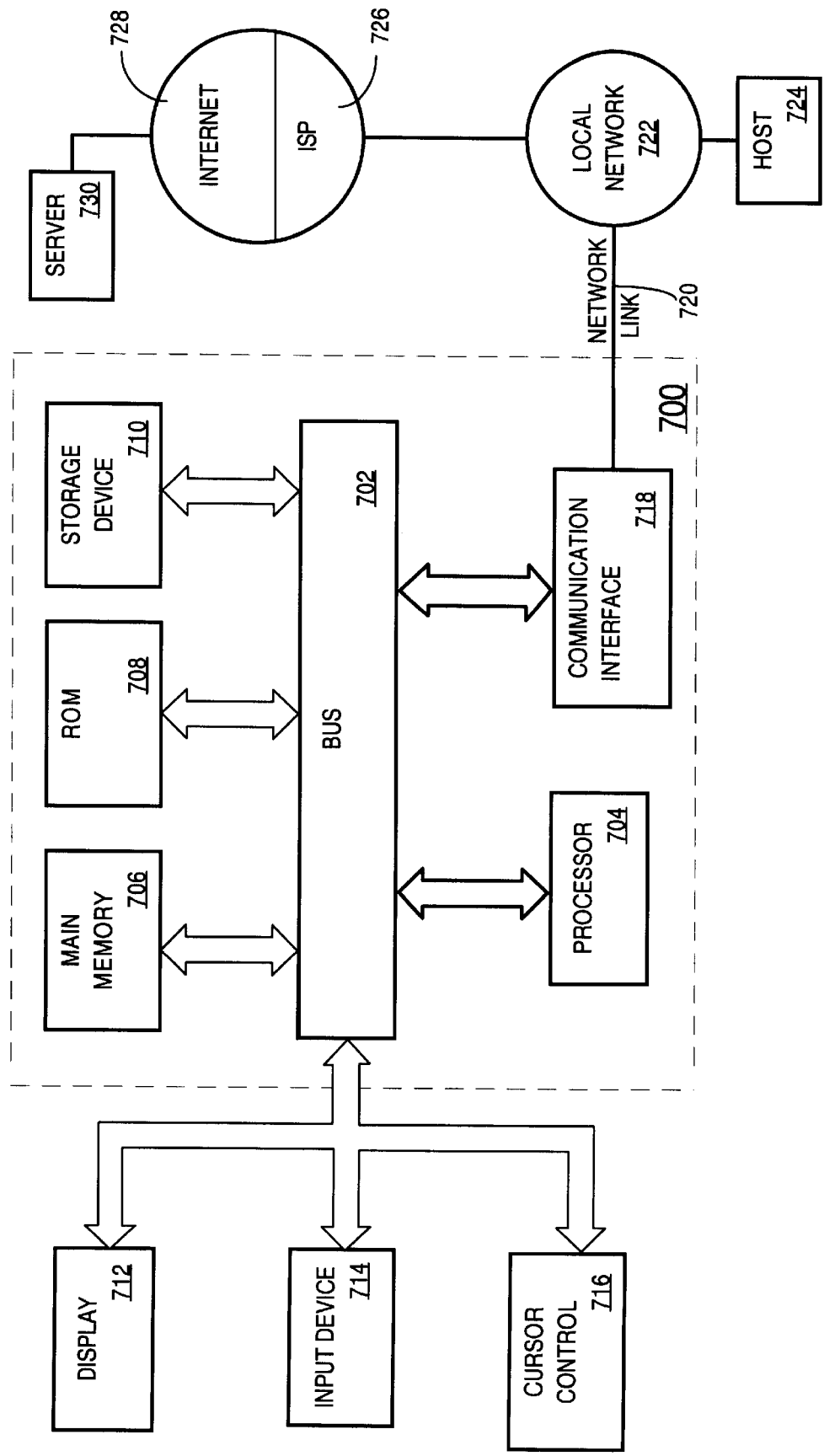
FIG. 7 is a block diagram showing a computer system used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a, carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing enterprise access to data, the method comprising the steps of:
   detecting that a database command is issued by a user against a database object containing records for a plurality of users that includes said user;
   before executing the database command against the database object, creating a modified database command based on the database command and issued against the same database object by selectively adding zero or more predicates to said database command that specify one or more criteria that is: satisfied by records containing data for said user, and not satisfied by records containing data for other users of said plurality of users; and
   executing said modified database command.

2. The method of claim 1,
   wherein said database object includes a column that contains values, wherein each value of said values identifies a particular user from said plurality of users; and
   wherein said one or more criteria is based on said column.

3. The method of claim 2, wherein said zero or more predicates are based on said column.

4. The method of claim 1, wherein the method further includes the step of storing a subset of the records which contain data for each user of said plurality of users in a partition contained in a separate tablespace.

5. The method of claim 4, wherein the method further includes the steps of:
   receiving queries that request to store the records in the database object, and
   determining which partition to store a particular record of said records based on the identity of each user of said plurality of users.

6. The method of claim 1, wherein prior to executing said modified database command, performing one or more query optimization operations based on said modified database command.

7. The method of claim 1, wherein records containing data for each user of said users are stored in a separate tablespace of a plurality of tablespaces.

8. The method of claim 1, further including the steps of
   detecting that a second database command is issued by said user against another database object; and
   determining, independently of the identity of the user, which records in said other database object satisfy said second database command.

9. The method of claim 1, wherein the user is associated with a session for which a plurality of context attributes has been established; and
   wherein predicates to add to said database command are based at least in part on current values of one or more of said plurality of context attributes.

10. The method of claim 1, further including the steps of invoking a policy function associated with said database object; and
    said policy function generating the zero or more predicates to add to said database command.

11. The method of claim 10, wherein:
    the user is associated with a session for which a plurality of context attributes has been established; and
    the policy function determines which predicates to add to said database command based at least in part on current values of one or more of said plurality of context attributes.

12. A method for managing access to data stored in a database system, the method comprising the steps of:
    adding a column to a database object containing records for users;
    transparent to said users, storing a value in the column for each row in the database object to indicate a user associated with the data in said each row, wherein said users do not expressly specify storing the value in the column for each row in the database object, and said value is generated according to metadata indicating how to generate values for said column; and
    satisfying queries issued by a particular user against said database object by providing data only from those rows in the database object that contain a value in the column identifying the particular user.

13. The method of claim 12, wherein the step of storing a value in each row includes said database system storing a default value generated according to metadata indicating how to generate values for said column.

14. The method of claim 12, wherein
    the user is associated with a session for which a plurality of context attributes has been established; and
    the method further includes the step of generating the value based on one or more context attributes that have been established for the session for the user.

15. The method of claim 12, wherein records containing data for each user of said users are stored in a separate tablespace of a plurality of tablespaces.

16. A computer-readable medium carrying one or more sequences of instructions for managing user access to data, wherein execution of the one or more sequences of instructions by one or more processors causes the one or more processors to perform the steps of:

detecting that a database command is issued by a user against a database object containing records for a plurality of users that includes said user;

before executing the database command against the database, creating a modified database command based on the database command and issued against the same database object by selectively adding zero or more predicates to said database command that specify one or more criteria that is: satisfied by record containing data for said user, and not satisfied by records containing data for other users of said plurality of users; and executing said modified database command.

17. The computer-readable medium of claim 16, wherein said database object includes a column that contains values, wherein each value of said values identifies a particular user from said plurality of users; and wherein said one or more criteria is based on said column.

18. The computer-readable medium of claim 17, wherein said zero or more predicates are based on said column.

19. The computer-readable medium of claim 16, wherein the steps further include the step of storing a subset of the records which contain data for each user of said plurality of users in a partition contained in a separate tablespace.

20. The computer-readable medium of claim 19, wherein the steps further include the steps of:

receiving queries that request to store the records in the database object, and determining which partition to store a particular record of said records based on the identity of each user of said plurality of users.

21. The computer-readable medium of claim 16, wherein the steps further include performing one or more query optimization operations based on said modified database command prior to executing said modified database command.

22. The computer-readable medium of claim 16, wherein records containing data for each user of said users are stored in a separate tablespace of a plurality of tablespaces.

23. The computer-readable medium of claim 16, wherein the steps further include the steps of detecting that a second database command is issued by said user against another database object; and determining, independently of the identity of the user, which records in said other database object satisfy said second database command.

24. The computer-readable medium of claim 16, wherein the user is associated with a session for which a plurality of context attributes has been established; and wherein predicates to add to said database command are based at least in part on current values of one or more of said plurality of context attributes.

25. The computer-readable medium of claim 16, further including the steps of invoking a policy function associated with said database object; and said policy function generating the zero or more predicates to add to said database command.

26. The computer-readable medium of claim 25, wherein:

the user is associated with a session for which a plurality of context attributes has been established; and the policy function determines which predicates to add to said database command based at least in part on current values of one or more of said plurality of context attributes.

27. A computer-readable medium for managing access to data stored in a database system, the computer-readable medium comprising the steps of:

adding a column to a database object containing records for users;

transparent to said users, storing a value in the column for each row in the database object to indicate a user associated with the data in said each row, wherein said users do not expressly specify storing the value in the column for each row in the database object, and said value is generated according to metadata indicating how to generate values for said column; and satisfying queries issued by a particular user against said database object by providing data only from those rows in the database object that contain a value in the column identifying the particular user.

28. The computer-readable medium of claim 27, wherein the step of storing a value in each row includes said database system storing a default value generated according to metadata indicating how to generate values for said column.

29. The computer-readable medium of claim 27, wherein the user is associated with a session for which a plurality of context attributes has been established; and the steps further include the step of generating the value based on one or more context attributes that have been established for the session for the user.

30. The computer-readable medium of claim 27, wherein records containing data for each user of said users are stored in a separate tablespace of a plurality of tablespaces.

* * * * *

UNITED STATES PATENT AND TRADEMARK OFFICE
CERTIFICATE OF CORRECTION

PATENT NO. : 6,587,854 B1
DATED : July 1, 2003
INVENTOR(S) : Guthrie et al.

It is certified that error appears in the above-identified patent and that said Letters Patent is hereby corrected as shown below:

Column 15,
Line 10, replace "database," with -- database object, --;
Line 15, replace "record" with -- records --.

Signed and Sealed this

Second Day of September, 2003

JAMES E. ROGAN
*Director of the United States Patent and Trademark Office*